United States Patent [19]
Corpus

[11] 4,030,456
[45] June 21, 1977

[54] VAPOR INJECTOR FOR INTERNAL COMBUSTION ENGINES

[76] Inventor: Daniel J. M. Corpus, 7181 Ridgedale Lane, Lambertville, Mich. 48144

[22] Filed: Nov. 5, 1975

[21] Appl. No.: 629,096

[52] U.S. Cl. .............................. 123/25 B; 123/25 N
[51] Int. Cl.² .......................................... F02D 19/00
[58] Field of Search ............ 123/25 R, 25 A, 25 B, 123/25 D, 25 N; 261/18 A

[56] References Cited
UNITED STATES PATENTS

| | | | |
|---|---|---|---|
| 1,178,913 | 4/1916 | Garber | 123/25 N |
| 1,357,039 | 10/1920 | Duntley | 123/25 B |
| 1,374,519 | 4/1921 | Olson | 123/25 B |
| 1,524,540 | 1/1925 | Dawdy | 123/25 N |
| 1,766,672 | 6/1930 | Moore | 123/25 N |
| 2,128,154 | 8/1938 | Masters | 123/25 N |
| 2,300,774 | 11/1942 | Cartmell | 123/25 L |
| 2,444,628 | 7/1948 | Briggs et al. | 123/25 B |
| 2,444,670 | 7/1948 | Porter | 123/25 B |
| 3,044,453 | 7/1962 | Hoffmann | 123/25 B |
| 3,494,339 | 2/1970 | Fernandez et al. | 123/25 R X |
| 3,716,040 | 2/1973 | Herpin | 123/25 R X |
| 3,760,778 | 9/1973 | May | 123/25 D X |
| 3,875,922 | 4/1975 | Kirmss | 123/25 R X |

*Primary Examiner*—Carroll B. Dority, Jr.
*Assistant Examiner*—Ira S. Lazarus
*Attorney, Agent, or Firm*—Oliver E. Todd, Jr.

[57] ABSTRACT

Improved apparatus for injecting vapors, such as water vapor in the form of low temperature-low pressure steam, into the intake manifold of an internal combustion engine. A controlled flow of air is drawn through a vapor generator by the intake manifold vacuum and the resulting air-vapor mixture is discharged through a nozzle into the intake manifold. The vapor generator contains a level controlled body of liquid for forming the vapor. Air enters the generator at the bottom of the liquid and rises through the liquid past a heater and a dispersion member which disperses the air into small bubbles. The heater is operated from the engine cooling system and heats the air and liquid sufficiently for generating steam at the subatmospheric pressures available from the intake manifold. The resulting steam-air mixture is injected into the intake manifold for controlling combustion. In a modified embodiment, liquid is also injected directly into an engine carburetor during acceleration.

6 Claims, 4 Drawing Figures

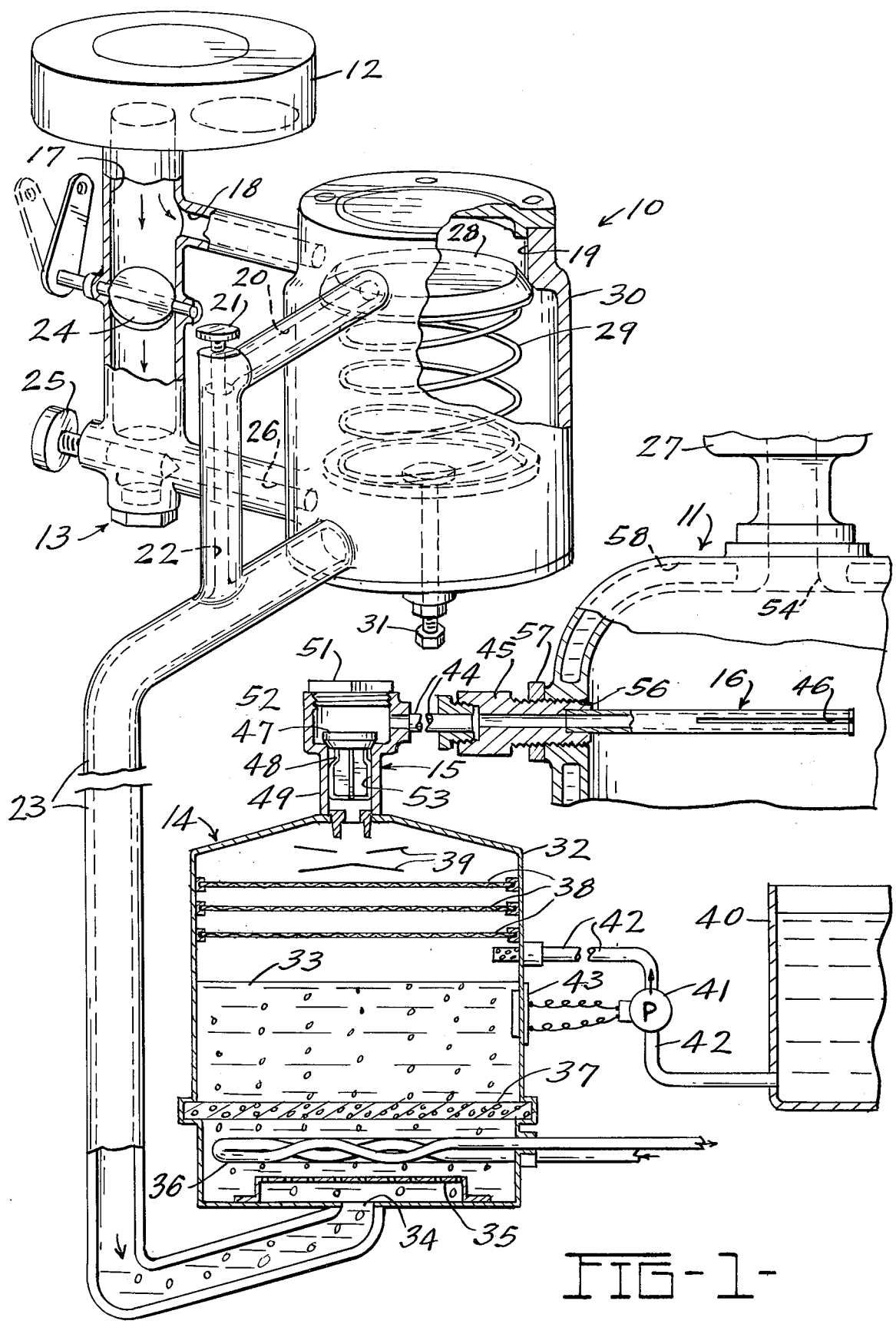
FIG-1-

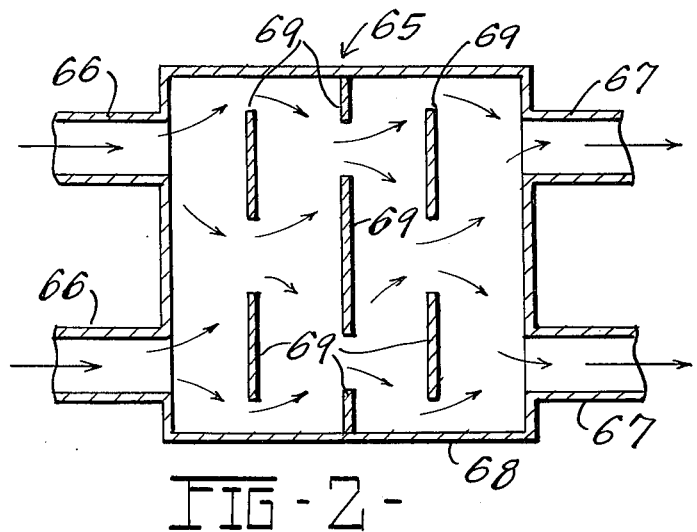
FIG-2-
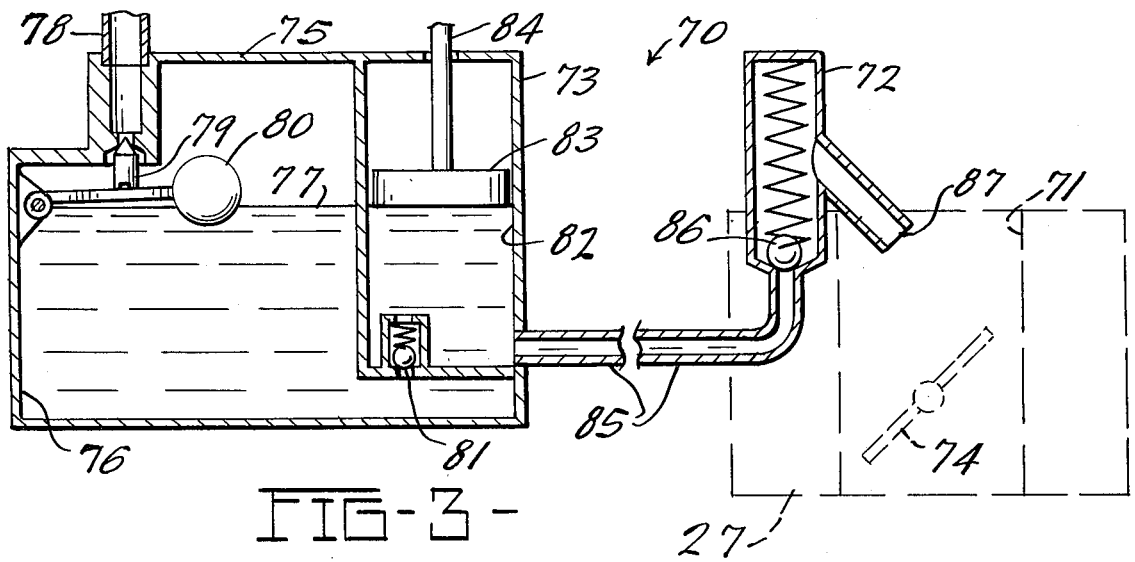
FIG-3-
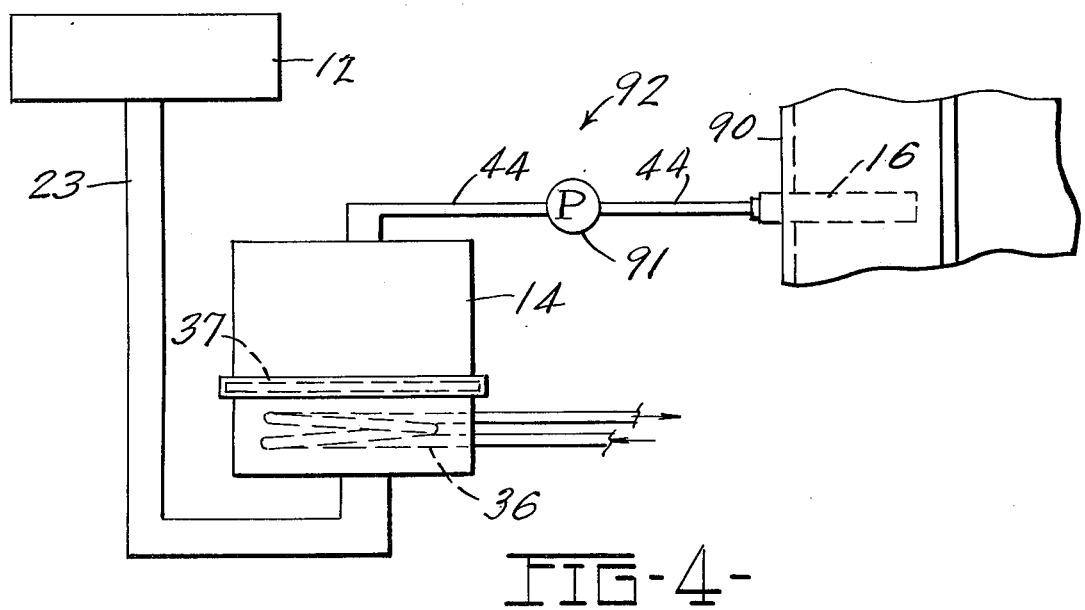
FIG-4-

VAPOR INJECTOR FOR INTERNAL COMBUSTION ENGINES

BACKGROUND OF THE INVENTION

This invention relates to internal combustion engines and more particularly to improved apparatus for injecting water vapor and similar vapors in the form of low pressure steam into an internal combustion engine.

It has long been recognized that the effective octane rating for fuels for internal combustion engines may be increased by injecting water vapor, alcohol-water vapor and other vapors into the engine cylinders along with the air-fuel mixture. The injected vapors produce different effects including lowering combustion temperatures and thereby lowering the flame front propagation rate. This, in effect, is the same as an increase in the effective octane rating for the fuel. The lower combustion temperatures also improve the composition of the exhaust gases by reducing the formation of nitrous oxides and other pollutants. The retardant action on the flame front propagation rate also reduces or eliminates engine "knock" or "ping", thereby allowing either a higher engine compression ratio and/or a greater advance in the ignition timing. These changes, in turn, may provide a greater horse power output from the engine and/or a lower fuel consumption rate. Still another benefit received from vapor injection is a reduction in carbon deposits on the piston and cylinder walls. This in turn reduces engine wear and also reduces contamination of the engine lubricating oil.

Various methods have been used in the past for injecting water vapor and the like into the cylinders of internal combustion engines for controlling combustion. One early method merely involved passing intake air through an evaporator for moistening the air. Moistening may be accomplished by various techniques such as by passing the air through a porous member which is wetted with the liquid or by bubbling the air through a reservoir or tank holding the liquid. Moistened air has also been injected into the engine's intake manifold. However, with this method, the quantity of moisture added to the air is limited. Another prior art method involves spraying liquid directly either into a carburetor intake or into the intake manifold for the engine. With this method, it is difficult to provide a uniform air-fuel-water vapor mixture to all cylinders. There is also difficulty in uniformly atomizing the sprayed liquid to prevent large droplets of the liquid from entering at least some of the cylinders.

SUMMARY OF THE INVENTION

According to the present invention, low pressure, low temperature steam is generated from water or a water-alcohol mixture or a similar liquid and is injected directly into the intake manifold of an internal combustion engine for controlling combustion. The vapor generating and injecting apparatus is adaptable for use with either spark-ignited internal combustion engines or diesel engines.

In a spark-ignited engine, the intake manifold vacuum draws air through an air flow control valve, a steam generator and a nozzle. The steam-air mixture emitted from the nozzle is discharged directly into the engine intake manifold below each carburetor throat for mixing with the air-fuel mixture from the carburetor. In a diesel engine, a separate air pump may be necessary for drawing air through the air filter, the control valve and the steam generator. The steam-air mixture from the pump is then discharged through nozzles into the engine's air intake manifold or into the air intake upstream of a supercharger, when the engine is so equipped.

The air flow control valve limits air fow through the steam generator to the intake manifold in accordance with engine demands. The valve includes a passageway which passes a controlled air flow at engine idle and a second passageway which provides an increased air flow as the engine throttle is depressed. This passageway includes a valve which is linked to the carburetor throttle valve. In addition, a third passageway contains a relief valve which passes additional air when the engine is decelerating, as when the engine throttle is released and the intake manifold vacuum is high.

The steam generator includes a closed chamber containing a body of water or other steam generating liquid. Air from the control valve is bubbled through the body of water, past screens and baffles which remove water droplets, and through a check valve. The vapor ladened air from the check valve is then supplied to one or more nozzles in the intake manifold. As the air passes through the body of liquid, the air and the liquid are heated by a heat exchanger connected to the engine cooling system. The heated air is also dispersed into very small bubbles by a porous stone or similar device. By heating to about 180° F to 195° F or more and maintaining an absolute pressure of about 7.5 to 10.4 psia from the intake manifold or an air pump, low pressure, low temperature steam is generated. The air flowing through the steam generator carries the resulting steam to the intake manifold nozzles.

In spark-ignited engines, the intake manifold vacuum drops when the throttle valve is opened during acceleration. This decrease in vacuum results in a corresponding decrease in the generation of steam. To compensate for this, a nozzle may be provided on the carburetor for spraying water directly into the carburetor throat. The nozzle is connected to a pump which is linked to the engine throttle value for spraying water into the carburetor throat only during acceleration. This nozzle and pump assembly and the air flow control valve may not be needed in a constant speed motor, such as an internal combustion engine which drives an electric generator.

Accordingly, it is an object of the invention to provide improved apparatus for injecting vapors into the intake manifold of an internal combustion engine.

Another object of the invention is to provide apparatus for generating steam and for injecting such generated steam into the intake manifold of either a spark-ignited or a diesel internal combustion engine.

Other objects and advantages of the invention will become apparent from the following detailed description, with reference being made to the accompanying drawings.

BRIEF DESCRIPTION OF THE DRAWINGS

FIG. 1 is a fragmentary, pictorial view, in partial section, showing apparatus for injecting steam into the intake manifold of a spark-ignited internal combustion engine in accordance with the present invention;

FIG. 2 is a cross-sectional view of a mixing chamber for mixing steam from a plurality of steam generators and delivering the uniform steam mixture to a plurality of nozzles in the intake manifold of an internal combustion engine;

FIG. 3 is a fragmentary, cross-sectional view of apparatus for spraying liquid directly into the throat of a carburetor on a spark-ignited internal combustion engine during acceleration; and FIG. 4 is a fragmentary, pictoral view showing apparatus in accordance with a modified embodiment of the present invention for injecting steam into the intake manifold of a diesel engine.

DESCRIPTION OF THE PREFERRED EMBODIMENTS

Turning now to the drawings and particularly to FIG. 1, apparatus 10 is shown for generating and injecting steam into the intake manifold 11 of a spark-ignited internal combustion engine. With modifications discussed below, the apparatus 10 is also adaptable for use with other types of internal combustion engines, such as diesel engines. The apparatus 10 generally comprises an air filter 12, and air flow control valve 13, a steam generator 14, a check valve 15 and a nozzle 16. It should be noted that these elements are not shown to scale in FIG. 1. The apparatus 10 is sealed, having openings only at the air filter 12 and the nozzle 16. Due to the vacuum within the intake manifold 11 produced during operation of the engine, air is drawn through the filter 12, the control valve 13, the steam generator 14 and the check valve 15 and discharged through the nozzle 16 into the intake manifold 11. As the air is drawn through the steam generator 14, the air picks up steam generated from water or other liquid maintained within the steam generator 14 and carries such steam into the intake manifold 11 for controlling combustion in the engine.

The vacuum within the engine intake manifold 11 varies with engine load and the position of the carburetor throttle valve. When the carburetor throttle valve is opened, there is a decrease in the intake manifold vacuum until the engine accelerates to a higher steady speed. Conversely, when the throttle valve is closed to slow down the engine, there is a considerable increase in the intake manifold vacuum until the engine slows down to its steady speed. Due to the variations in the intake manifold vacuum, it is necessary to control the air flow through the steam generator 14. If the air flow is not controlled, too much air will flow into the intake manifold 11 under certain engine operating conditions while insufficient air will flow into the intake manifold 11 under other conditions. Since variations in air flow of this type may adversely affect the efficiency of the engine, the air flow control valve 13 is provided.

The air filter 12 is connected to an air intake duct 17 for the air flow control valve 13. During engine idle, air flows from the duct 17 through a passageway 18 into a chamber 19 and from the chamber 19 through a passageway 20, a needle valve 21 and a passageway 22 into an outlet duct 23. The outlet duct 23 is connected to supply controlled flow of clean air to the steam generator 14. The needle valve 21 is adjusted during engine idle. This needle valve 21 is adjusted during engine idle. This needle valve 21 is adjusted to provide the best idling for the engine. Two other air flow paths are provided in parallel with the path through an idle or low speed needle valve 21. The air intake duct 17 is connected through a throttle control valve 24 and a high speed needle valve 25 to a passageway 26 which is connected with the outlet duct 23. The valve 24 is linked to a throttle valve in a carburetor 27 for the engine. The valve 24 is connected such that it is opened as the carburetor throttle valve is opened and, preferably, that it becomes fully opened when the carburetor throttle valve is approximately ⅔ or ** open. While the engine is operated at a speed such that the valve 24 is fully opened, the high speed needle valve 25 is adjusted to provide the flow of air and steam required for peak engine operation. The other air passageway through the air flow control valve 13 involves a relief valve 28. The relief valve 28 is positioned at the bottom of the chamber 19 and is biased by a spring 29 to normally seat against a housing 30. The tension on the spring 29 is adjusted by means of a screw or bolt 31 attached to the bottom of the housing 30. The relief valve 28 comes into operation when the throttle valve in the carburetor 27 is closed during high speed operation of the engine to decelerate the engine. The resulting high intake manifold vacuum is sufficient to open the relief valve 28. Air flowing through the relief valve 28 aids in combustion of the fuel mixture supplied to the engine cylinders and also increases air flow through the cylinders for enabling the engine to exhaust properly. The relief valve 28 functions to reduce exhaust pollutants from the engine during deceleration.

As indicated above, the outlet duct 23 from the air flow control valve 13 is connected to the steam generator 14. The steam generator 14 generally comprises a closed housing 32 which holds a body of steam generating liquid 33. Normally, the liquid 33 will consist of water or of an alcohol-water mixture. However, it will be appreciated that other liquids known in the art may also be used. Air enters the housing 32 through an opening 34 and bubbles upwardly through the body of liquid 33. As the air moves upwardly, it passes through a porous plate 35 which disperses the air up into bubbles, past a heat exchanger 36 and through an "air stone" which is a porous stone or other member which breaks the air up into minute bubbles. The heat exchanger 36 is connected to the engine cooling system such that heated coolant is circulated through the heat exchanger 36 and then to the engine radiator. The heat exchanger 36 should be designed with a sufficiently large area such that the air and liquid passing through the heat exchanger 36 is heated to at least 180° F and preferably to 190° F or more. As the air is heated and dispersed by the porous member 37, the minute air bubbles passing upwardly through the body of liquid 33 becomes saturated with steam. Upon leaving the surface of the body of liquid 33, the steam-air mixture passes through a plurality of fine mesh screens 38 and past baffles 39 which separate any liquid particles from the steam-air mixture.

As liquid is carried off from the body of liquid 33 in the steam generator 14, the liquid is replenished from a reservoir 40. The reservoir 40 is connected through a pump 41 and pipes 42 to the steam generator 14. A liquid level sensor 43 is also attached to the steam generator housing 32. When the level of the body of liquid 33 drops below the sensor 43, the pump 41 is energized to replenish the liquid. In a modified embodiment, the level sensor 43 may be replaced with a float valve for maintaining the liquid level within the steam generator 14. The pump 41 then may be controlled by a pressure shutoff switch which shuts off the pump 41 after the float valve closes and the pressure in the pipe 42 between the pump 41 and the housing 32 exceeds a predetermined level.

The intake manifold vacuum draws the steam and air mixture from the steam generator 14 upwardly through the check valve 15, through a pipe 44 and a threaded fitting 45. The steam-air mixture is then discharged through horizontal slits 46 in the nozzle 16 into the intake manifold 11. The check valve 15 includes a valve closure member 47 having wire guides 48 attached thereto for limiting the valve closure member 47 to vertical movement within a housing 49. Gravity normally urges the valve closure member 47 into sealing engagement with a seat 50 formed in the housing 49. A cap 51 is threaded into the housing 49 for forming a closed chamber 52 above the valve closure member 47. The chamber 52 is connected through the pipe 44 and the fitting 45 to the nozzle 16. The region 53 below the valve closure member 47 communicates directly with the steam generator 14. During normal operation of the engine, the vacuum within the intake manifold 11 is sufficient to raise the valve closure member 47 off of the seat 50 for drawing air and steam through the check valve 15. The check valve 15 functions to prevent a reverse flow of the air-fuel mixture in the intake manifold 11 into the steam generator 14 during the initial stages of acceleration. During engine idle, for example, there will be a relatively high vacuum in the intake manifold 11. This vacuum is also present in the steam generator 14 because of the connection through the nozzle 16, the fitting 45, the pipe 44 and the check valve 15. When the engine is accelerated from an idle, there is a considerable decrease in the intake manifold vacuum. A time lag caused by the length of the duct 23, the pipe 44 and other connections in the apparatus 10 results in a low absolute pressure within the steam generator 14 than in the intake manifold 11. The check valve 15 prevents a reverse flow from the intake manifold 11 to the steam generator 14 under these conditions. Since the throttle valve 24 is also opened during acceleraton, the lower vacuum conditions present in the steam generator 14 will rapidly be relieved by a greater flow of air through the air flow control valve 13. When the absolute pressure within the steam generator 14 again exceeds the pressure within the intake manifold 11, the flow of air and steam to the intake manifold 11 will resume.

The engine intake manifold 11 is modified from a conventional intake manifold. In the embodiment shown in FIG. 1, the carburetor 27 is of a downdraft design having a downwardly directed throat 54 for directing an air-fuel mixture downwardly into the intake manifold 11. The manifold 11 is modified by providing a threaded opening 56 in alignment with the carburetor throat 54 so that the nozzle 16 will be located below the throat 54. The nozzle 16 is mounted in the fitting 45 which is in turn threaded into the opening 56, The fitting 45 is threaded into the opening 56 to adjust the nozzle 16 so that the slits 46 are located directly below the carburetor throat 54 and are directed perpendicular to the flow of the air-fuel mixture emitted from the carburetor throat 54. Once the fitting 45 is properly positioned in the intake manifold opening 56, it is locked in place by means of a nut 57. The positioning of the nozzle 16 with the slits 46 located directly below the throat 54 and aimed perpendicular to the flow of the air-fuel mixture provides a uniform mixing action between the steam-air mixture emitted from the nozzle 16 and the air-fuel mixture emitted from the carburetor throat 54.

In an engine having either a plurality of carburetors or a plural throat carburetor, it may be necessary to provide several nozzles 16 in the intake manifold for uniformly mixing steam with the air-fuel mixture. In such an embodiment, a mixing chamber is provided in the pipe 44 for distributing the air-steam from the steam generator 14 to each of the nozzles 16. It may also be desirable to modify the intake manifold 11 by surrounding the manifold 11 with a water jacket 58. Heated engine coolant is circulated through the water jacket 58 for heating the manifold 11. The heat supplied to the manifold 11 prevents steam emitted from the nozzles 16 from condensing on cool interior surfaces of the manifold 11. Water jackets (not shown) may also be provided about the fitting 45 and the pipe 44 when the engine is operated in colder environments.

As indicated above, the engine may be provided with several nozzles 16 for emitting a steam-air mixture below each carburetor throat 54. For larger engines, it may also be desirable to have several steam generators 14 for supplying the steam requirements of the engine. FIG. 2 shows an exemplary mixing chamber 65 for providing uniform steam-air mixtures to each nozzle in an engine. In the exemplary mixing chamber 65, two input connections 66 are provided for connections to check valves 15 on two separate steam generators 14 and two separate output connections 67 are provided for connections to two separate nozzles 16. Of course, any number of input connections 66 may be provided for the number of steam generators 14 used in a particular system and, similarly, any number of output connections 67 may be provided for supplying steam to any number of nozzles 16. The mixing chamber 65 merely comprises a hollow housing 68 having a number of baffles 69 positioned therein for mixing steam from the different generators 14 and providing a uniform mixture to the output connections 67. The mixing chamber 65 is positioned in the pipes 44 connecting the outputs of the steam generators 14 to the nozzles 16.

When a carburetor throttle valve is opened during acceleration, there is a sudden decrease in the intake manifold vacuum. This decrease in the vacuum results in a momentary interruption in the steam generating and injecting apparatus 10. By injecting steam into the engine, the engine may be adjusted to operate at a higher compression ratio for a given fuel octane rating and/or the ignition system may be adjusted to have a greater advance in the spark timing. Therefore, the engine may tend to knock during acceleration when steam is interrupted. FIG. 3 shows apparatus 70 for spraying a stream of water directly into the air intake opening 71 of the carburetor 27. The apparatus 70 includes a nozzle 72 which is mounted on the existing engine carburetor 27 and a water pump 73 which is operated from linkages (not shown) connected with a carburetor throttle valve 74. The pump 73 includes a housing 75 which forms an enclosed chamber 76 for holding a body of water or similar liquid 77. An external source of the liquid 77, such as the water reservoir 40 and pump 41 shown in FIG. 1, is connected through a hose 78 and a float valve 79 to the chamber 76. A float 80 is hinged to open and close the valve 79 for maintaining a constant level for the liquid body 77. The body of liquid 77 in the chamber 76 is connected through a check valve 81 to a cylinder 82. A piston 83 is moved in the cylinder 82 by means of a rod 84 which is linked to the throttle valve 74. When the throttle valve 74 is closed by releasing the accelerator pedal in a vehicle, for example, the piston 83 is raised and liquid is drawn through the check valve 81 into the cylinder 82. When the throttle valve 74 is subsequently opened by depressing the accelerator pedal, the piston 84 is moved downwardly in the cylinder 82 and the liquid within the cylinder 82 is forced through a line 85 to the nozzle 72. In the nozzle 72, the liquid moves past a check valve 86 and is sprayed through an opening 87 into the carburetor air intake opening 71. This additional water or other liquid sprayed into the carburetor air intake opening 71 compensates for the momentary interruption in steam applied to the intake manifold 11 during acceleration to prevent possible ignition knock. As the engine speed increases to a constant speed, as determined by the setting of the throttle valve 74, the water spray from the nozzle opening 87 ceases and, at the same time, the increased intake manifold vacuum draws more steam through the nozzle 16. Of course, in constant speed engines such as an engine used for driving an electric generator, there will be no fluctuation in the intake manifold vacuum and the apparatus 70 is not needed.

In the case of a diesel engine, fuel is injected directly into the cylinders and only air passes through an intake manifold 90. The engine speed is controlled by controlling the amount of fuel injected during each engine cycle. Many diesel engines are provided with a supercharger which results in a high pressure in the intake manifold 90 rather than a vacuum. Even without a supercharger, no appreciable vacuum is present in the intake manifold 90 of some diesel engines. Therefore, a pump 91 is provided in steam generating apparatus 92 for creating the necessary vacuum for the steam generator 14. The use of the pump 91 eliminates the need for a check valve 15. In the embodiment shown in FIG. 4, air is drawn through the air filter 12 and the duct 23 to the steam generator 14. From the steam generator 14, an air-steam mixture is drawn through the line 44 by the pump 91. The pump 91 then forces the air-steam mixture to one or more nozzles 16 located either in the intake manifold 90 or in the air intake to a supercharger. Since many diesel engines are operated at a substantially constant speed, no air flow control valve 13 is shown in the embodiment of FIG. 4. If the diesel engine is to be operated at variable speeds, an air flow control valve 13 may be positioned in the duct 23 for controlling the amount of steam supplied to the intake manifold 90. Such air flow control valve 13 would then be controlled along with the engine speed to provide the necessary flow of steam to the nozzle 16. In supercharged diesel engines, it may be desirable to connect the apparatus 92 to inject steam to the air intake manifold upstream from the supercharger. The steam would then pass through the supercharger and into the engine cylinders along with normal outside air.

From the above description, it will be appreciated that the apparatus for generating and injecting steam into internal combustion engines is adaptable to both spark-ignited internal combustion engines and diesel engines. In either case, one or more low temperature, low pressure steam generators are used for generating steam for injection into the engine along with the normal air-fuel mixture for controlling combustion. Preferably, the steam generator includes a heat exchanger which is heated from heated coolant in the cooling system for the engine. The heat exchanger circuit may include a valve or thermostat for controlling the temperature to which the air and liquid in the steam generator is heated. However, it should be appreciated that the heat exchanger may be of other types, such as an electrically heated heat exchanger. It should also be appreciated that various other modifications and changes may be made in the above-described apparatus without departing from the spirit and the scope of the following claims.

What I claim is:

1. An improved vapor injector for an internal combustion engine comprising, in combination, nozzle means for injecting vapor into the engine, means for generating vapors for injection into the engine, means for drawing air through said vapor generating means whereby such air becomes mixed with vapors, means for supplying such air-vapor mixture to said nozzle means, said vapor generating means including housing means for holding a body of vapor generating liquid, means for supplying air to the bottom of such body of liquid, such air bubbling upwardly through such body of liquid, means for heating such liquid and air as such air bubbles upwardly and such liquid and porous means for dispersing such air into small bubbles as such air bubbles upwardly in such liquid, and valve means for controlling the flow of air to said vapor generating means in response to the load requirements of the engine, wherein said valve means includes first and second separate air passages between an air inlet and said vapor generating means, needle valve means for limiting air flow through said first passage, throttle valve means for controlling air flow through said second passage, and means for controlling said throttle valve means along with an engine control throttle whereby said second passage is substantially closed when the engine throttle is closed and said second passage is opened as the engine throttle is opened.

2. An improved vapor injector for an internal combustion engine, as set forth in claim 1, wherein said nozzle means includes a nozzle and means mounting said nozzle in the intake manifold of the engine, and wherein said means for drawing air through said vapor generating means includes the intake manifold vacuum.

3. An improved vapor injector for an internal combustion engine, as set forth in claim 2, and further including a normally closed check valve and means mounting said check valve between said vapor generating means and said nozzle for preventing a flow of gases from the intake manifold to said vapor generating means, said normally closed check valve opening in response to the intake manifold vacuum.

4. An improved vapor injector for an internal combustion engine, as set forth in claim 1, wherein said valve means further includes a third passage in parallel with said first and second passages, and normally closed pressure responsive valve means in said third passage for opening said third passage in response to a predetermined high vacuum in said vapor generating means.

5. An improved vapor injector for an internal combustion engine, as set forth in claim 1, wherein said valve means further includes adjustable means for controlling the maximum flow through said second passage when said throttle valve means is open.

6. An improved vapor injector for an internal combustion engine, as set forth in claim 1, wherein said heating means comprises a heat exchanger located within said housing means, and means for circulating a liquid coolant from the engine through said heat exchanger whereby waste heat from the internal combustion engine is transferred to said heat exchanger.

* * * * *

UNITED STATES PATENT OFFICE
CERTIFICATE OF CORRECTION

Patent No. 4,030,456　　　　　　　　　Dated　June 21, 1977

Inventor(s) Daniel J.M. Corpus

It is certified that error appears in the above-identified patent and that said Letters Patent are hereby corrected as shown below:

Column 2, line 6, "fow" should be -- flow --.
Column 4, line 3, "**" should be -- 3/4 --.
Column 5, line 53, "," should be -- . --.

Signed and Sealed this

Twentieth Day of September 1977

[SEAL]

*Attest:*

RUTH C. MASON　　　　　　LUTRELLE F. PARKER
*Attesting Officer*　　　*Acting Commissioner of Patents and Trademarks*